Jan. 23, 1962 J. E. DAVIS ET AL 3,017,946
VEHICULAR SPEED CONTROL SYSTEM
Filed Dec. 19, 1958 2 Sheets-Sheet 1

INVENTORS
James E. Davis &
BY  Wallace A. Roos
ATTORNEY

Jan. 23, 1962   J. E. DAVIS ET AL   3,017,946
VEHICULAR SPEED CONTROL SYSTEM
Filed Dec. 19, 1958   2 Sheets-Sheet 2

INVENTORS
James E. Davis &
Wallace A. Roos
BY
ATTORNEY

United States Patent Office 3,017,946
Patented Jan. 23, 1962

3,017,946
VEHICULAR SPEED CONTROL SYSTEM
James E. Davis and Wallace A. Roos, Houston, Tex.,
assignors to Otis I. McCullough, Houston, Tex.
Filed Dec. 19, 1958, Ser. No. 781,794
10 Claims. (Cl. 180—82.1)

This application relates to speed responsive apparatus, and more particularly, to apparatus responsive to the speed of a motor vehicle along a controlled-speed highway.

It is now conventional in almost all States to post speed limits of different speed-limit zones along each highway, for the protection of pedestrians, animals, and operators and passengers in motor vehicles. However, it is well known that speed limits are very generally ignored by drivers and it has become desirable either to forcefully bring to the attention of drivers the speed limit of the zone in which they are traveling, or even to positively control the maximum speed of any vehicle passing through each zone.

The apparatus of the present invention is designed to furnish, in the motor vehicle, a positive response to the speed limit of each different speed zone. Preferably, this response consists of a movement of a governor of the maximum speed of the vehicle, though the response may consist of an indication, for instance, on the dashboard of the vehicle.

The apparatus of the invention, more specifically, provides for response to speed limits by locating spaced strips of radioactive material in number corresponding with the speed limit at the entrance end of each different-speed zone. A controlled vehicle, under the invention, would have a radiation detector therein which responds to passage of the vehicle by each of such strips to develop a pulse of voltage. The radiation detector is connected to an appropriate means responsive to the number of voltage pulses received thereby at the entrance of each zone, either to indicate the speed or to control the setting of the speed governor.

The apparatus of the invention will now be more fully described in conjunction with the drawings, showing a preferred embodiment thereof.

Figure 1:
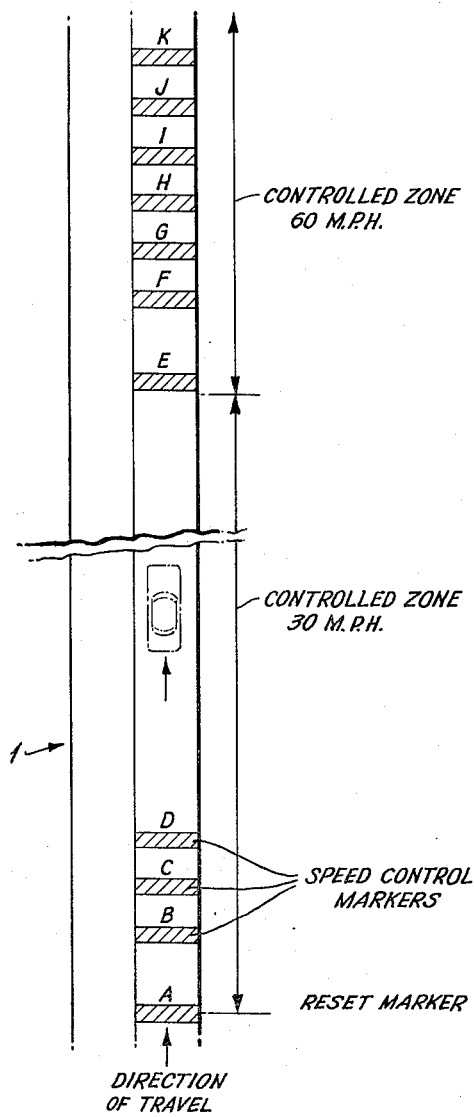
FIG. 1 is a diagrammatic showing of a highway having a pair of different-speed limit zones, with numbers of radioactive strips in each zone corresponding to the speed limit.

Referring now to FIG. 1, a two-lane highway 1 is shown provided with appropriate radioactive strips in order to form two controlled speed zones, namely, a lower speed zone, indicated as 30 miles per hour, and an upper speed zone, indicated as 60 miles per hour. Each opposite direct lane of the highway would have the necessary radioactive markers, but for convenience of illustration, only the right-hand lane is shown as provided with such markers.

The right-hand lane of the highway is shown as provided with two sets of markers of radioactive material, each of which may be formed of naturally-occurring radioactive deposits or deposits of suitable radio isotopes. The strips may be actually embedded in the concrete or other road surface during building of the highway, or, in the case of an existing highway to be provided with the invention, the radioactive strips or markers may be laid down on the surface, or along the outer edge of the highway. The radioactive material may be appropriately selected to emit gamma rays, beta rays, neutrons, etc.

As indicated, the highway strip which is shown is provided with two zones of different speed limit. In the first, or 30 miles per hour zone, the first radioactive marker strip A constitutes a reset marker for purposes to be explained hereinafter. The second through fourth radioactive strips, labelled B–D, provide a control indicative of the speed limit, there being three strips corresponding to a 30 miles per hour speed limit.

In the second or 60 miles per hour zone, the strip E constitutes the reset marker, and the strips F through K form speed setting strips, indicative of a limit of 60 miles per hour.

It will be evident that the particular number of strips illustrated is not critical and that any number which bears a determinable relationship to the speed limit in that zone may be used. Each speed limit zone, at any rate, will have a number of radioactive strips corresponding to the speed limit of that zone, arranged along the entrance end of the zone and spaced apart along the direction of travel on that portion of the highway. It is indicated that radioactive strips extend across the entire lane of the highway, but this obviously is not necessary. They could as well extend part way across the lane, or could be spaced apart along the side of the roadway.

Figure 2:
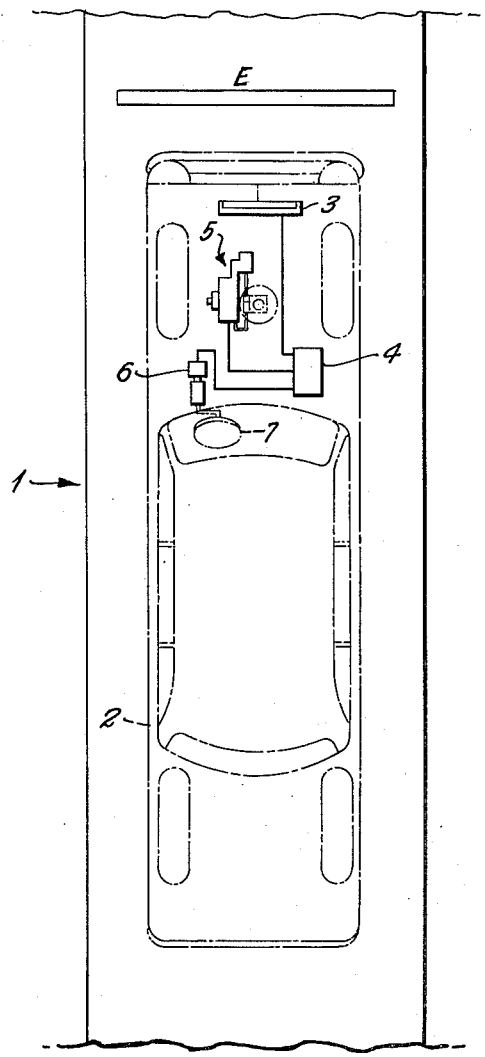
FIG. 2 is a top plan view of a portion of FIG. 1, showing the motor vehicle and the associated radiation-responsive apparatus in more detail.

Referring now to FIG. 2, an automobile 2 is shown approaching a radioactive strip which may be reset marker E. The automobile carries a radiation detector 3 of any appropriate type, such as a Geiger-Müller counter, an ionization chamber, a scintillation counter or the like. All that is necessary is that the detector respond to passage of the vehicle by a radioactive strip to yield a pulse of voltage. The detector 3 is connected to an appropriate amplifier 4 which may be of conventional type employed to amplify the detector pulses to a level suitable for control of a governor unit 5 to which the output of the amplifier is connected. The governor will be described in more detail hereinafter.

The vehicle is also preferably provided with a brake release switch 6 which resets the governing mechanism when the brake pedal 7 is depressed, as will be later explained.

Figure 3:
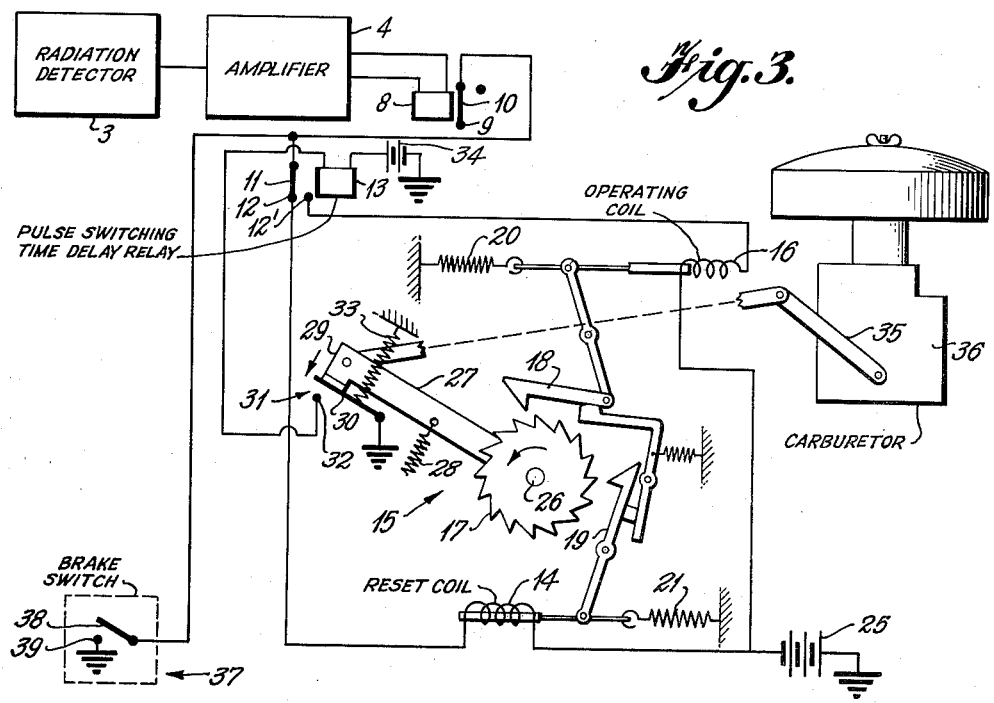
FIG. 3 is a schematic and diagrammatic view of the apparatus in the motor vehicle, with the apparatus shown in position corresponding to entrance of the vehicle into a speed-controlled zone.

Referring now to FIG. 3, the output of amplifier 4 is provided to the energizing coil of an appropriate relay 8 which has a grounded movable contact 9. The normally disengaged stationary contact 10 of the relay is connected through the movable contact 11 and normally engaged stationary contact 12 of a pulse switching time delay relay 13 to the reset coil 14 of a ratchet relay generally indicated at 15. In addition to the reset coil 14, the ratchet relay also includes an operating coil 16, connected to relay contact 12′, and which is operable by means to be described to advance the ratchet wheel 17 by one step or increment for each pulse of voltage supplied to the operating coil. The reset coil, on the other hand, is operable to allow return of the ratchet wheel to its normal or reset position, whenever the reset coil is supplied with a pulse of voltage.

Figure 4:
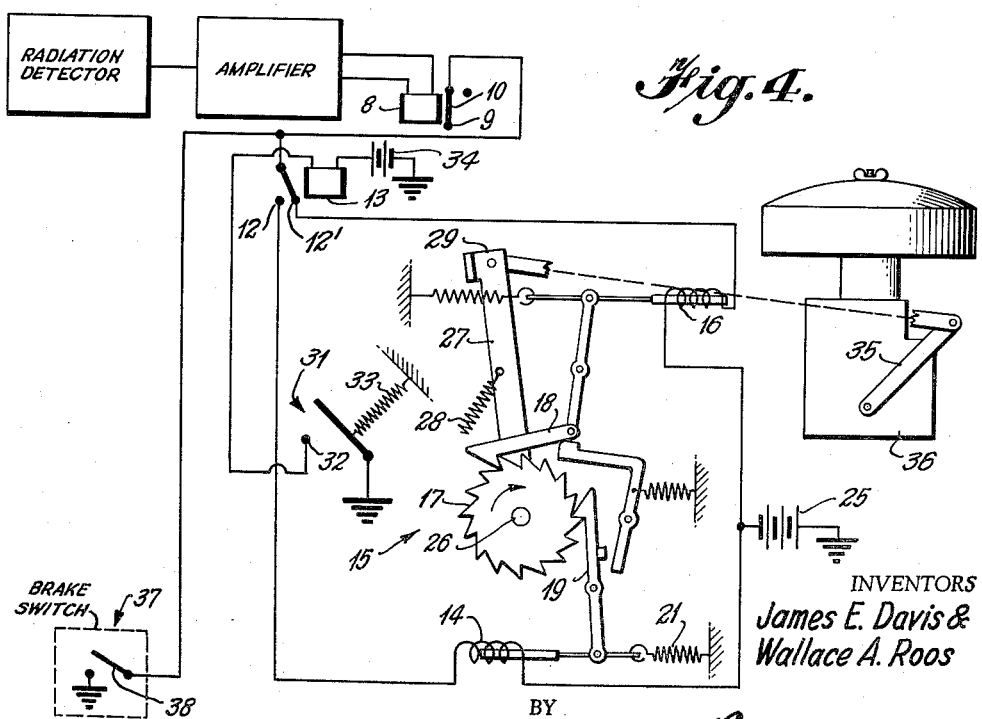
FIG. 4 is a view corresponding to FIG. 3 but showing the apparatus in position corresponding to passage of the vehicle by the first or reset radioactive strip in a controlled zone.

The ratchet wheel 17 is supplied with an appropriate device to urge the wheel in a counterclockwise direction, as indicated by the arrow in FIG. 3, to the reset position. An appropriate device is a spring. However, the ratchet wheel 17 is provided with a pair of ratchet members 18 and 19, each of which is operable when engaged with the ratchet wheel teeth to restrain the wheel against movement in the counterclockwise direction. The ratchet members 18 and 19 are respectively connected mechanically to the cores of the operating and reset coils of the ratchet relay. When the operating coil 16 is energized, as indicated in FIG. 4, it pulls the upper end of the lever arm of ratchet member 18 toward the right to move the ratchet member 18 to the left along the teeth of the ratchet wheel, his motion being against the restraining force provided by spring 20. When the pulse of voltage passes, the operating coil releases its core and the spring 20 returns the upper end of the lever arm of the ratchet member to the left, thus moving the ratchet member itself to the right and advancing the ratchet wheel 17 in a clockwise direction, as shown in FIG. 4.

During each energization of the operating coil, the reset coil is deenergized, so that the ratchet member 19 is in engagement with the ratchet wheel and prevents it from moving in a counterclockwise direction. However, when the reset coil is energized by a pulse of voltage, it pulls its core toward the left of FIG. 3, thereby pulling the connected ratchet member 19 toward the right out of engagement with the ratchet wheel, against the force of spring 21. Ratchet member 19 is mechanically connected to ratchet member 18 in appropriate fashion (not shown) such that when ratchet member 19 is disengaged from the ratchet wheel, ratchet member 18 is also disengaged therefrom, as shown in FIG. 3. The result is that when reset coil 14 is energized, both ratchet members move away from the ratchet wheel and permit it to return in a counterclockwise direction to its reset position. On the other hand, when operating coil 16 is energized neither ratchet member moves away from the wheel, but rather ratchet member 19 stays engaged and ratchet member 18 merely moves along the teeth thereof, so that the ratchet wheel is retained against the spring return force.

The sides of reset coil 14 and operating coil 16 remote from the contacts of relay coil 13 are connected together to one side of a voltage source shown as battery 25. The other side of the battery is grounded so as to complete an energizing circuit for the one of operating coil 16 and reset coil 14 determined by the condition of the time delay relay 13 whenever relay 8 is energized. In other words, in the position shown in FIG. 3, if the radiation detector passes a radioactive strip, the resultant pulse of voltage obtained from amplifier 4 energizes relay 8, closing contacts 9 and 10 and completing the energizing circuit for reset coil 14, thus causing the reset coil to return the ratchet wheel to reset position.

The ratchet wheel rotates on a shaft 26 which carries a lever arm 27 urged counterclockwise by an appropriate spring 28. Lever arm 27 carries a switch engaging member 29 which operates during counterclockwise motion of lever 27 to force the movable contact 30 of a switch 31 into engagement with its fixed contact 32. The movable contact 30 is normally urged out of engagement with its fixed contact by an appropriate spring member 33.

Movable contact 30 of switch 31 is grounded while fixed contact 32 is connected to one side of the operating coil of time delay relay 13. The other side of the coil is connected through an appropriate voltage source, indicated as battery 34, to ground.

When the ratchet wheel 17 moves in the counterclockwise direction toward its reset position, as shown in FIG. 3, it moves lever arm 27 in the same direction, as shown by the arrow in the figure. Just before these parts reach their reset position, the switch engaging member 29 comes into engagement with movable switch contact 30 and moves it into engagement with fixed contact 32. Thereby, whenever the ratchet wheel 17 is in reset position, the switch 31 is closed to complete an operating circuit for time delay relay 13. The relay is then energized and moves its movable contact 11 into engagement with fixed contact 12'. This fixed contact is connected to operating coil 16, as indicated above. As a result of these connections, when the time delay relay is energized, the operating coil 16 receives a pulse of voltage each time relay 8 is energized by passage of the radiation detector by a radioactive strip.

Rotation of the ratchet wheel in the clockwise direction by successive operations of reset coil 16 is shown in FIG. 4. In that figure, the operating coil 16 is indicated as energized by closure of the contacts of relay 8. When those contacts open due to passage of the vehicle beyond the radioactive strip, the operating coil 16 releases to cause ratchet member 18 to move the ratchet wheel in a clockwise direction by one increment thereof.

The time delay relay 13 is of an appropriate type well known in the art which remains energized for a time period after operating current therefore is removed. The relay is selected to have a time delay greater than the time expected to be taken by a vehicle in passing all of the radioactive strips at the entrance of each speed zone. Thereby, with the relay 13 energized by closure of switch 31, it remains energized despite movement of the ratchet wheel in the clockwise direction, and opening of the switch 31, for a time period long enough to maintain the energizing circuit for operating coil 16 until all of the speed marker strips have been passed.

The ratchet lever arm 27 is connected through an appropriate linkage to a governor operated arm 35. This governor arm is shown as pivoted to the usual carburetor 36 and may be connected therein to any appropriate governor of a type well known in the art. For instance, the governor arm 35 could be connected to a gate or other appropriate type of valve in the fuel line, which valve would be nearly closed in the position of governor arm 35, shown in FIG. 3, and would be nearly wide open in the position thereof shown in FIG. 4. Thereby, the maximum speed of the vehicle with the ratchet relay 15 in reset condition would be a minimum, while the maximum speed in any other position would be greater by an amount determined by the number of increments of clockwise rotation given the ratchet wheel, and therefore the governor arm 35.

It will be apparent that the governor means may be of a different type than that indicated above, and though the governor may control a valve which is in series with the accelerator valve in the fuel supply line, the governor member may also be the only control for the amount of fuel admitted to the carburetor. In such case, the speed of the vehicle would be absolutely controlled by the speed of the zone in which the vehicle is moving, determined by the number of radioactive markers at the entrance of the zone.

It will be evident that it is not desirable to have the governor arm 35 in wide open condition when the operator of the vehicle is attempting to stop the car or decelerate the car by depressing the brake pedal. Therefore, the apparatus is provided with a brake switch 37 which is closed only when the pedal is depressed, and which includes a movable contact 38 and a stationary contact 39. The stationary contact is grounded, while the movable contact is connected to movable contact 11 of time delay relay 13. Thereby, whenever the brake pedal is depressed, switch 37 closes to provide an energizing circuit for whichever one of the ratchet relay coils is then connected to movable contact 11.

In operation of the apparatus of the preferred embodiment, assuming the motor vehicle is moving into a new speed zone, such as the 60 miles per hour zone shown in FIG. 1, the vehicle first passes radioactive strip E, the reset strip. The resulting pulse of voltage at the output of amplifier 4 energizes relay 8, as indicated in FIG. 3, thus completing the energizing circuit for reset coil 14. As the reset coil 14 energizes, it moves ratchet members 18 and 19 out of engagement with ratchet wheel 17. The ratchet wheel then rotates under control of its spring, in a counterclockwise direction, to its reset position. The ratchet lever arm 27 simultaneously moves in a counterclockwise direction with the ratchet wheel and moves the governor arm 35 in the same direction, thus reducing the governor setting. When the ratchet wheel 17 reaches its reset position, the governor setting is at a minimum and the switch 31 is closed. The energizing circuit for pulse switching time delay relay 13 is thereby completed and the relay energizes to move its movable contact 11 into engagement with fixed contact 12'.

The pulse of voltage from amplifier 4 is of duration corresponding to the width of the radioactive strip. After the vehicle has passed radioactive strip E, the pulse ceases, and relay 8 is deenergized. The energizing circuit for reset coil 14 is thereby interrupted and the ratchet members 18 and 19 return to their normal positions shown in FIG. 4.

When the vehicle passes speed control marker strip F, relay 8 is once more energized, and, the time delay relay 13 then being energized, an energizing circuit for operating coil 16 is completed. The operating coil therefore moves ratchet arm 18 to the left to the position shown in FIG. 4. Ratchet member 19 remains in engagement with the teeth of ratchet wheel 17 in order to restrain the wheel against movement in a counterclockwise direction, despite this movement of ratchet member 18. When the vehicle gets by marker strip F, relay 8 deenergizes, thus opening the circuit of operating coil 16 and allowing the ratchet member 18 to move the ratchet wheel by one step or increment in the clockwise direction, during its return motion.

The operation above described in connection with marker strip F repeats for each of the speed control marker strips, until marker strip K is passed, and the ratchet wheel 17 reaches the position corresponding to the 60 miles per hour limit. At that time, the governor arm 35 is in a corresponding position. Also, shortly thereafter, the time delay of relay 13 expires, and the relay deenergizes to cause engagement of contacts 11 and 12. The circuit to the operating coil 16 is thereby opened, and the circuit to reset coil 14 is prepared for operation whenever the radiation detector supplies a new pulse of voltage to relay 8. This pulse only occurs when the vehicle leaves that speed zone and enters a new speed zone. The vehicle then passes an appropriate reset marker strip and the ratchet relay 15 is returned to its reset position, in the manner described above.

It will be evident that the apparatus could be provided with an indicator for showing the motor vehicle operator the speed limit of the zone in which he is travelling, in addition to, or in lieu of, a speed controlling function. Such an indication could be obtained through an appropriate countertype indicator mounted on the dashboard and controlled by ratchet wheel 17.

It will also be obvious that many other changes could be made in the apparatus above described without departure from the scope of the invention. The invention therefore is not to be considered limited to the particular embodiment described herein, but rather only by the scope of the appended claims.

We claim:

1. Motor vehicle speed control apparatus comprising a plurality of strips of radioactive material closely spaced along a highway at the entrance end of each controlled highway zone, there being successively a reset strip and a number of additional strips corresponding with the speed limit of each zone at the entrance end of that zone, radiation-detection means in a vehicle operable to develop a pulse of voltage for each radioactive strip passed by the vehicle, speed governor means in the vehicle movable from a reset position corresponding to minimum controlled-speed of the vehicle successively to positions corresponding with increasing controlled-speeds, and means connected to said radiation detection means operable to move said governor means to said reset position when the detection means responds to said reset strip and then to move said governor means through its said successive positions corresponding to the number of said other radioactive strips responded to by the detection means, at the entrance end of each speed zone.

2. The apparatus of claim 1 including means operable when the brake pedal of the vehicle is depressed to deactivate the means controlling the governor adjustment.

3. The apparatus of claim 1 in which said means connected to said radiation-detection means includes a step member having an operate coil and a reset coil associated therewith, said operate coil being operable to move the step member by one increment in one direction for each pulse of voltage received thereby, said reset coil being operable when a pulse of voltage is received thereby to return the step member in the opposite direction to a reset position, a mechanical connection between said step member and said speed governor means, and time delay means operable to complete a circuit between said radiation-detection means and said operate coil when said step member is in said reset position and for a time period after it leaves the reset position longer than the anticipated travel time of the vehicle past all the radioactive strips at the entrance end of each controlled zone and operable thereafter to complete a circuit between said radiation-detection means and said reset coil, whereby, after the expiration of said time period, the first voltage pulse from the radiation-detection means returns the step member to its reset position and each succeeding pulse during said time period moves the step member by one increment in said one direction.

4. The apparatus of claim 3 in which said time delay means includes a time delay relay having an energizing circuit including a voltage source and a switch which is closed to complete the energizing circuit only when said step member is in its reset position, said relay being operable to remain energized for said time period after said switch opens.

5. The apparatus of claim 3 including means operable when the brake pedal of the vehicle is depressed to return said step member to its reset position.

6. For use with a highway speed controlling system having a plurality of strips of radioactive material closely spaced along the highway in each zone of different speed limit, there being a reset strip and a number of other strips corresponding to the speed limit of each zone at the entrance end of that zone, apparatus in a motor vehicle for furnishing a response to the speed limit of each zone comprising radiation-detector means operable to develop a pulse of voltage each time the vehicle passes a radioactive strip, a first relay supplied with the output of said detector means so as to be energized each time a pulse of voltage is developed thereby, a step member having an operate coil operable to move the step member by one increment in one direction each time it is energized and a reset coil operable to return the step member in the opposite direction to a reset position each time it is energized, a switch connected to said step member and closed thereby only when the step member is in reset position, and a time delay relay having an energizing circuit including a voltage source and said switch so that it is energized each time the switch is closed and for a time period thereafter long enough for the vehicle to move from a reset radioactive strip past the last one of said number of radioactive strips at the entrance end of any speed zone, the contacts of said time delay relay being operable to connect said reset coil to said first relay when the time delay relay is deenergized and to connect said operate coil to said first relay when the time delay relay is energized, said first relay being operable each time it is energized to supply a pulse to the one of said reset and operate coils then connected thereto, and means connected to said step member operable to furnish a response to the position thereof.

7. The apparatus of claim 6 having means operable when the brake pedal of the vehicle is depressed to return the step member to reset position.

8. The apparatus of claim 6 in which said means connected to said step member includes a speed governor mechanically connected to the step member and operable to move therewith from a position of minimum speed when the step member is in reset position in the direction of increasing speed as the step member moves in said one direction.

9. The apparatus of claim 8 in which said step member and associated operate and reset coils form parts of a ratchet relay having a ratchet wheel biased toward said reset position, and a mechanical connection between the shaft of said ratchet wheel and said governor.

10. The apparatus of claim 6 including a second voltage source and in which said first relay includes a set of contacts which are closed only when the relay is energized, said time delay relay has a movable contact connected to one contact of said first relay and a pair of stationary contacts respectively connected through the reset coil and the operate coil through said second voltage source to the other one of said first relay contacts, said time delay relay being operable when energized to move its movable contact from engagement with its stationary contact connected to the reset coil into engagement with its stationary contact connected to the operate coil, and a switch closed only when the brake pedal of the vehicle is depressed and having one of its contacts connected to the movable contact of said time delay relay and its other contact connected to said other contact of said first relay.

References Cited in the file of this patent
UNITED STATES PATENTS

| | | |
|---|---|---|
| 2,209,158 | Goldsmith | July 23, 1940 |
| 2,493,755 | Ferrill | Jan. 10, 1950 |
| 2,656,002 | Keeton et al. | Oct. 20, 1953 |
| 2,750,583 | McCullough | June 12, 1956 |
| 2,816,617 | Lee | Dec. 17, 1957 |
| 2,852,086 | Cordry | Sept. 16, 1958 |
| 2,916,100 | Teetor | Dec. 8, 1959 |